United States Patent [19]

Gergen

[11] Patent Number: 4,874,825

[45] Date of Patent: Oct. 17, 1989

[54] POLYMER BLEND OF CARBON MONOXIDE OLEFIN COPOLYMER AND POLYETHER ESTERAMIDE POLYMER

[75] Inventor: William P. Gergen, Houston, Tex.

[73] Assignee: Shell Oil Company, Houston, Tex.

[21] Appl. No.: 208,437

[22] Filed: Jun. 20, 1988

[51] Int. Cl.$^4$ ................................................ C08G 67/02
[52] U.S. Cl. .................................... 525/425; 525/426
[58] Field of Search ............................ 525/425, 426

[56] References Cited

U.S. PATENT DOCUMENTS

| | | | |
|---|---|---|---|
| 2,495,286 | 1/1950 | Brubaker | 260/63 |
| 3,694,412 | 9/1972 | Nozaki | 260/63 |
| 4,207,410 | 6/1980 | Burzin | 528/288 |
| 4,252,920 | 8/1978 | Deleens | 525/430 |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 1081304 | 8/1967 | United Kingdom . |

Primary Examiner—Harold D. Anderson
Assistant Examiner—T. Mosley
Attorney, Agent, or Firm—Dean F. Vance

[57] ABSTRACT

Non-miscible blends of a linear alternating polymer of carbon monoxide and at least one ethylenically unsaturated hydrocarbon with polyether esteramide polymers show good processability and improved surface characteristics.

13 Claims, No Drawings

POLYMER BLEND OF CARBON MONOXIDE OLEFIN COPOLYMER AND POLYETHER ESTERAMIDE POLYMER

FIELD OF THE INVENTION

This invention relates to an improved polymer blend comprising predominantly a linear alternating polymer of carbon monoxide and at least one ethylenically unsaturated hydrocarbon. More particularly, the invention relates to blends of the linear alternating polymer with a polyether esteramide polymer.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. No. 1,081,304 produced similar polymers of somewhat higher carbon monoxide content in the presence of alkylphosphine complexes of palladium salts as catalyst. Nozaki extended this process to produce linear alternating polymers in the presence of arylphosphine complexes of palladium moieties and certain inert solvents. See, for example, U.S. Pat. No. 3,694,412.

More recently, this class of linear alternating polymers has become of great interest because of the greater availability of the polymers in quantity. These polymers, often referred to as polyketones or polyketone polymers, have been shown to be of the repeating formula —CO—(A)—wherein A is the moiety of unsaturated hydrocarbon polymerized through the ethylenic unsaturation. By way of further illustration, when the ethylenically unsaturated hydrocarbon is ethylene the polymer is represented by the repeating formula —CO—($CH_2$—$CH_2$)-. The general process for the more recent production of such polyketone polymers is illustrated by a number of published European Patent Applications including 121,965 and 181,014. The process typically involves a catalyst composition formed from a compound of a Group VIII metal selected from palladium, cobalt or nickel, the anion of a strong non-hydrohalogenic acid and a bidentate ligand of phosphorus, arsenic or antimony.

The resulting polymers are relatively high molecular weight thermoplastics having established utility in the production of shaped articles such as containers for the food and drink industry and internal and external parts for the automotive industry, which articles are produced by processing the polymer according to known methods. For some particular applications it has been found to be desirable to have properties for a polymeric composition which are somewhat different from those of the polyketone polymers. It would be of advantage to retain the more desirable properties of the polyketone polymer and yet improve other properties. These advantages are often obtained through the provision of a polymer blend.

SUMMARY OF THE INVENTION

The present invention relates to blends of a linear alternating polymer of carbon monoxide and at least one ethylenically unsaturated hydrocarbon with other polymeric material. More particularly, according to the invention, there are provided blends of the linear alternating polymer and a polyether esteramide. Such blends exhibit improved surface appearance and improved processability.

DESCRIPTION OF THE INVENTION

The polyketone polymers which are employed as the major component of the blends of the invention are linear alternating copolymers of carbon monoxide and at least one ethylenically unsaturated hydrocarbon. Suitable ethylenically unsaturated hydrocarbons which are useful as precursors of the polyketone polymers have up to 20 carbon atoms inclusive, preferably up to 10 carbon atoms inclusive and are aliphatic such as ethylene and other alpha-olefins including propylene, butylene, isobutylene, 1-hexene, 1-octene and 1-dodecene, or are arylaliphatic having an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, m-propylsytrene and p-ethylstyrene. Preferred polyketone polymers are copolymers or carbon monoxide and ethylene or terpolymers of carbon monoxide, ethylene and a second hydrocarbon of at least three carbon atoms, particularly an alpha-olefin such as propylene.

The structure of the polyketone polymers is that of a linear alternating polymer and the polymer will contain substantially one molecule of carbon monoxide for each molecular of ethylenically unsaturated hydrocarbon. When terpolymers of carbon monoxide, ethylene and a second hydrocarbon are employed as a blend component in the blends of the invention, there will be within the terpolymer at least two units incorporating a moiety of ethylene for each unit incorporating a moiety of the second hydrocarbon. Preferably there will be from about 10 to about 100 units incorporating a moiety of ethylene for each unit incorporating a moiety of the second hydrocarbon. The polymer chain will therefore be represented by the repeating formula

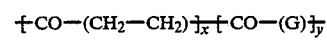

wherein G is the moiety obtained by polymerization of the second hydrocarbon through the ethylenic unsaturation. The —CO—($CH_2$—$CH_2$)- units and the —CO—(G)—units are found randomly through the polymer chain and the ratio of y:x is no more than about 0.5. In the modification where copolymer of carbon monoxide and ethylene is employed as a blend component there will be no second hydrocarbon present and the polyketone polymer is represented by the above formula wherein y=0. When y is other than 0, i.e., terpolymers are employed, ratios of y:x from about 0.01 to about 0.1 are preferred. The end groups or "caps" of the polymer chain will depend on what materials are present during the production of the polyketone and whether and how the polymer has been purified. The precise properties of the polymer will not depend upon the particular end groups to any considerable extent so that the polymer is fairly represented by the above formula for the polymer chain. Of particular interest are the polyketones of number average molecular weight from about 1,000 to about 200,000, particularly those of number average molecular weight from about 20,000 to about 90,000 as determined by gel permeation chromatography. The physical properties of such polymers will depend in part on the molecular weight, whether the polymer is a copolymer or a terpolymer, and in the case of terpolymers the proportion of the second hydrocarbon present. Typical melting points for such polymers are from about 175° C. to about 300° C., preferably from about 210° C. to about 270° C. The polymers have a limiting viscosity number (LVN), measured in a standard capillary viscosity measuring device in m-cresol at 60° C., of from about 0.5 to about 8, preferably from about 0.8 to about 4.

A method of producing the polyketone polymers which is now becoming conventional is to contact the carbon monoxide and the unsaturated hydrocarbon(s) in the presence of a catalyst composition formed from a palladium compound, the anion of a non-hydrohalogenic acid having a pKa below about 6 and a bidentate phosphorus ligand. The scope of the production of polyketone is extensive but, without wishing to be limited, a preferred palladium compound is a palladium carboxylate, particularly palladium acetate, the preferred anion is the anion of trifluoroacetic acid or para-toluenesulfonic acid and the preferred bidendate ligand is 1,3-bis(diphenylphosphino)propane or 1,3-bis[di(2-methoxyphenyl)phosphino]propane. Such a process for polyketone production is illustrated by copending U.S. patent application Serial No. 930,468, filed November 14, 1986 (Docket No. K-0722).

Polymerization is conducted in the gas phase in the substantial absence of reaction diluent or in a liquid phase in the presence of a reaction diluent such as an alkanol, e.g., methanol or ethanol. The reactants are contacted under polymerization conditions in the presence of a catalyst composition by conventional methods such as shaking or stirring in a reaction vessel. Suitable reaction temperatures are from about 20° C. to about 150° C., preferably from about 50° C. to about 135° C. Typical reaction pressures are from about 1 bar to about 100 bar, more often from about 10 bar to about 100 bar. Subsequent to reaction the polymer is recovered as by decantation or filtration. The polymer product may contain residues of the catalyst composition which are removed, if desired, by treatment with a solvent or a complexing agent which is selective for the residues.

The minor component of the blends of the invention is a polyether esteramide polymer, e.g., a polymer incorporating a polyether portion and at least one other portion which contains ester linkages and amide linkages, or both. The polyether esteramide is a random copolymer or is a block copolymer so long as the polyether, ester and amide portions are contained within the polymer molecule. The particular structure of the polyether esteramide polymer will vary and will depend greatly upon the particular way the polyether esteramide polymer is produced.

In one modification, the polyether esteramide is produced by reacting (a) one or more compounds selected from omega-aminocarboxylic acids or lactams, the compounds having 10 or more carbon atoms, (b) an alpha,omega-dihydroxy(polyoxyalkylene oxide), particularly an alpha,omegadihydroxy(polytetrahydrofuran), having an average molecular weight of from about 160 to about 3000, and (c) an organic dicarboxylic acid. The weight ratio of the amino acid and/or lactam portion of the polymerr should be from about 30:70 to about 98:2, based on total polymer.

Illustrative of the omega-amino-carboxylic acid or lactam is lauryllactam, 12-aminododecanoic acid and 11-aminoundecanoic acid. The diol of component (b) is a dihydroxy(polyoxyalkylene oxide), particularly an alpha,omega-dihydroxy(polytetrahydrofuran) having a molecular weight of from about 500 to about 1200. The dicarboxylic acids of component (c) are straight-chain dicarboxylic acids of from 6 to 13 carbon atoms inclusive. Such dicarboxylic acids include adipic acid, subenic acid, sebacic acid and dedecandioic acid. Adipic acid is preferred.

The polyether esteramide is produced by heating the reactants in the presence of from about 2% by weight to about 30% by weight of the water, based on component (a) under internal pressure in a closed reactor at 230-300° C. After water is removed as steam, the mixture is maintained at 250-280° C. under normal or reduced pressure in the absence of oxygen. The resulting polymer is a random polymer in which the units of the starting compounds are randomly distributed along the polymer chain.

In a second and generally preferred modification, the polyether esteramide is a block copolymer comprising blocks of the polymer components, e.g., blocks of the esteramide component and the polyether component. Such block polyether esteramide polymers are represented by the repeating formula

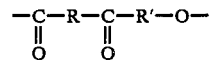

wherein R represents the polyamide moiety illustratively derived from a dicarboxylic polyamide by loss of the two terminal carboxyl groups and R' is the polyoxyalkylene moiety illustratively derived by loss of the two terminal hydroxy groups from a polyoxyalkylene glycol.

The dicarboxylic polyamide is produced by methods known in the art such as polycondensation of one or more lactams and/or omega-aminoacids or by polycondensation of a dicarboxylic acid with a diamine. When the polyamide portions is produced from lactams or aminoacids, it is preferred that the lactam or aminoacid contain a straight-chain alkylene moiety of from 4 to 11 carbon atoms inclusive, as illustrated by caprolactam, lauryllactam, 12-aminododecanoic acid and 11-aminoundecanoic acid. Caprolactam is preferred. When the polyamide portion is produced from a diamine and a dicarboxylic acid, the preferred diamines are straight-chain diamines of from 4 to 12 carbon atoms inclusive, particularly hexamethylenediamine and nonamethylenediamine. The preferred dicarboxylic acids have from 4 to 12 carbon atoms inclusive and are illustrated by adipic acid, azelic acid, sebacic acid and dodecandioic acid. Adipic acid is preferred. the polyamide portion is produced by contacting the reactants, often in the presence of an excess of dicarboxylic acid to limit the chain length of the polyamide portion. Good results are obtained if the carboxylic polyamide has an average molecular weight of from about 300 to about 15,000, preferably from about 800 to about 5000.

The polyoxyalkylene glycol portion comprises linear or branched polyoxyalkylene glycols wherein the alkylene moiety has at least two carbon atoms, e.g., polyoxyethylene glycol, polyoxypropylene glycol or polyoxytetramethylene glycol as well as copolymers of such glycols. Polyoxytetramethylene glycol is preferred. The average molecular weight of the polyoxyalkylene glycol is suitably from about 100 to about 6000, but preferably is from about 200 to about 3000.

The weight ratio of the polyoxyalkylene glycol to the dicarboxylic polyamide is from about 5:95 to about 85:15, based on total polymer, but preferably is from about 10:90 to about 50:50 on the same basis. The reaction of the polyoxyalkylene glycol portion and the dicarboxylic polyamide portion is conducted in the molten state, e.g., from about 100° C. to about 400° C., in the presence of an alkoxide catalyst which is preferably a zirconium or hafnium tetraalkoxide wherein each alkyl independently has up to 24 carbon atoms. The reactant contact is maintained by vigorous agitation, such as by stirring, at a reduced pressure on the order of from about 0.05 mm to about 5 mm Hg.

The production of polyether esteramides is well known in the art and is described in more detail by Burzin, U.S. Pat. No. 4,207,410, in the case of random polymers and by Deleens, U.S. Pat. No. 4,252,920 in the case of block copolymers. Certain of the polyether esteramides are commercially available and are marketed by Atochem Inc., Polymers Division under the tradename PEBAX.

The blends of the invention comprise a major proportion of the polyketone polymer and a minor proportion of the polyether esteramide. The precise proportion of the polyether esteramide polymer is not critical and amounts of polyether esteramide polymer from about 0.5% by weight to about 45% by weight, based on total blend, are satisfactory. Amounts of polyether esteramide from about 1% by weight to about 20% by weight on the same basis are preferred.

The method of producing the blend of the polyketone polymer and the polyether esteramide polymer is not material so long as a relatively uniform distribution of the polyether esteramide polymer throughout the polyketone is obtained. The polyketone polymer/polyether esteramide polymer blend is a non-miscible blend with the polyether esteramide existing as a discrete phase in the polyketone matrix having a phase size of from about 0.1 micron to about 1.4 micron, more typically on the order of 0.5 micron. The blend will therefore not be homogeneous but good results are obtained when the distribution of the polyether esteramide polymer is substantially uniform. The method of blending the components is that which is conventional for non-miscible polymer materials. In one modification the blend components in particulate form are mixed and passed through an extruder to produce the blend as an extrudate. In an alternate modification, the components are blended in a mixing device which exhibits high shear.

The blends of the invention may also contain conventional additives such as antioxidants, stabilizers, fillers, fire retardant materials, mold release agents and other substances which are added to improve the processability of the polymer components or to improve the properties of the resulting blend. Such additives are added prior to, together with or subsequent to the blending of the polyketone polymer and the polyether esteramide polymer.

The blends of the invention are characterized by improved processability and improved surface characteristics without severe loss in toughness. The blends are therefore of particular utility where articles are to be produced which require good surface appearance. The blends are processed by conventional methods such as injection molding and extrusion into sheets, films, plates, fibers and shaped articles which have particular application in the packaging industry and in the production of shaped containers such as for food and drink.

The invention is further illustrated by the following Illustrative Embodiments which should not be construed as limiting.

ILLUSTRATIVE EMBODIMENT I

A terpolymer of carbon monoxide, ethylene and propylene was produced in the presence of a catalyst composition formed from palladium acetate, the anion of trifluoroacetic acid and 1,3-bis[di(2-methoxyphenyl)phosphino]propane. The terpolymer had a melting point of 220° C. and an LVN, measured in m-cresol at 60° C., of 1.29.

ILLUSTRATIVE EMBODIMENT II

A blend of the terpolymer of Illustrative Embodiment I was prepared with 10% by volume based on total blend of PEBAX ® 6312 polyether esteramide. PEBAX 6312 polyether esteramide was obtained from Atochem, Inc. and is a block copolymer of polyoxytetramethylene glycol and polycaprolactam with a melting temperature of 248° C. The polyketone terpolymer contained approximately 0.5% by weight of Irganox 1076 and 0.2% by weight Ionol, two conventional hindered phenolic antioxidants to provide background stabilization. 0.5% by weight based on total polymer of Ethyl AO 330, another hindered phenolic antioxidant, was added to the blend composition. The blend was prepared in a 30mm twin screw Haake extruder at 255° C. A sample of the terpolymer of Illustrative Embodiment I containing stabilizer was also extruded as a control. The injection pressure during extrusion was substantially lower for the blend than for the control. The resulting polymeric blend was nonmiscible as evidenced by examination of cold-cut samples, stained with ruthenium tetroxide, under an electron microscope. The polyether esteramide was present as a discrete phase having a particle size approximately 0.5 micron in diameter. The blend had a significantly improved surface appearance in comparison to the control sample. Room temperature notched izod impact strength was measured using ASTM method D256 and the impact strengths for the blend and the control were comparable. The results of the measurements are given in Table I.

TABLE I

| Sample | Injection Pressure (psi) | Surface Gloss | Surface Texture | Notched Izod (ft-lb/in) |
|---|---|---|---|---|
| Control | 500 | Dull | Textured | 3.1 |
| 10% v Blend | 400 | Extremely High | Smooth | 3.0 |

What is claimed is:

1. A composition comprising a non-miscible blend of, as a major component, a linear alternating polymer of carbon monoxide and at least one ethylenically unsaturated hydrocarbon and, as a minor component, a polyether esteramide polymer.

2. The composition of claim 1 wherein the linear alernating polymer is represented by the repeating formula

wherein G is the moiety of an ethylenically unsaturated hydrocarbon of at least 3 carbon atoms polymerized through the ethylenic unsaturation and the ratio of y:x is no more than about 0.5.

3. The composition of claim 2 wherein the polyether esteramide is a random polymer of (a) one or more compounds selected from omega-aminocarboxylic acid of 10 or more carbon atoms inclusive or lactam of 10 or more carbon atoms inclusive, (b) an alpha, omega-dihydroxy(polyoxyalkylene oxide) of an average molecular weight from about 160 to about 3000 and (c) a dicarboxylic acid of from 6 to 13 carbon atoms inclusive, the weight ratio of (a) to (b)+(c) being from about 30:70 to about 98:2, based on total polyether esteramide polymer.

4. The composition of claim 3 wherein the compound selected from omega-aminocarboxylic acid or lactam is lauryllactam, the dihydroxy(polyoxyalkylene oxide) is alpha,omega-dihydroxy(polytetrahydrofuran) and the dicarboxylic acid is adipic acid.

5. The composition of claim 4 wherein G is a moiety of propylene and the ratio of y:x is from about 0.01 to about 0.1.

6. The composition of claim 2 wherein the polyether esteramide is a block copolymer of the repeating formula

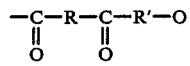

wherein R is the polyamide moiety derived by loss of the two terminal carboxyl groups from a dicarboxylic polyamide of average molecular weight from about 300 to about 15,000 as determined by gel permeation chromatography, and R' is the polyoxyalkylene moiety derived by loss of the two terminal hydroxyl groups of a polyoxyalkylene glycol of a molecular weight from about 100 to about 6000 as determined by gel permeation chromatography.

7. The composition of claim 6 wherein the dicarboxylic polyamide is the product of a straight-chain diamine of from 4 to 12 carbon atoms inclusive and an excess of straight-chain dicarboxylic acid of from 4 to 12 carbon atoms inclusive.

8. The composition of claim 7 wherein the polyoxyalkylene glycol is polyoxytetramethylene glycol.

9. The composition of claim 8 wherein y is zero.

10. The composition of claim 8 wherein G is the moiety of propylene and the ratio of y:x is from about 0.01 to about 0.1.

11. The composition of claim 6 wherein the dicarboxylic polyamide is the product of polycondensation of caprolactam with an omega-aminoacid.

12. The composition of claim 11 wherein the polyoxyalkylene glycol is polyoxytetramethylene glycol.

13. The composition of claim 12 wherein G is a moiety of propylene and the ratio of y:x is from about 0.01 to about 0.1.

* * * * *